Figure 1:
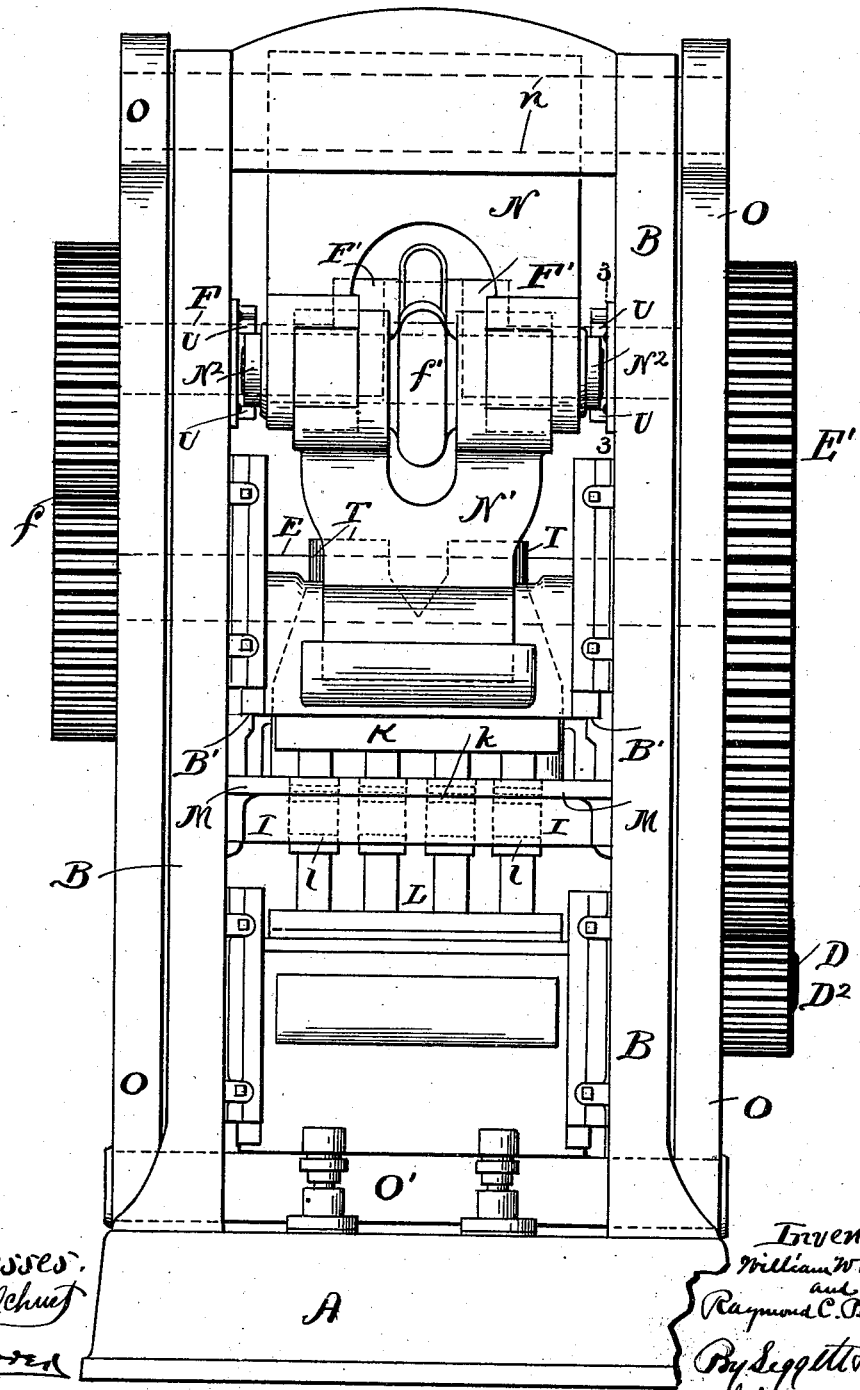

(No Model.) 3 Sheets—Sheet 1.

W. W. WALLACE & R. C. PENFIELD.
BRICK PRESS.

No. 548,936. Patented Oct. 29, 1895.

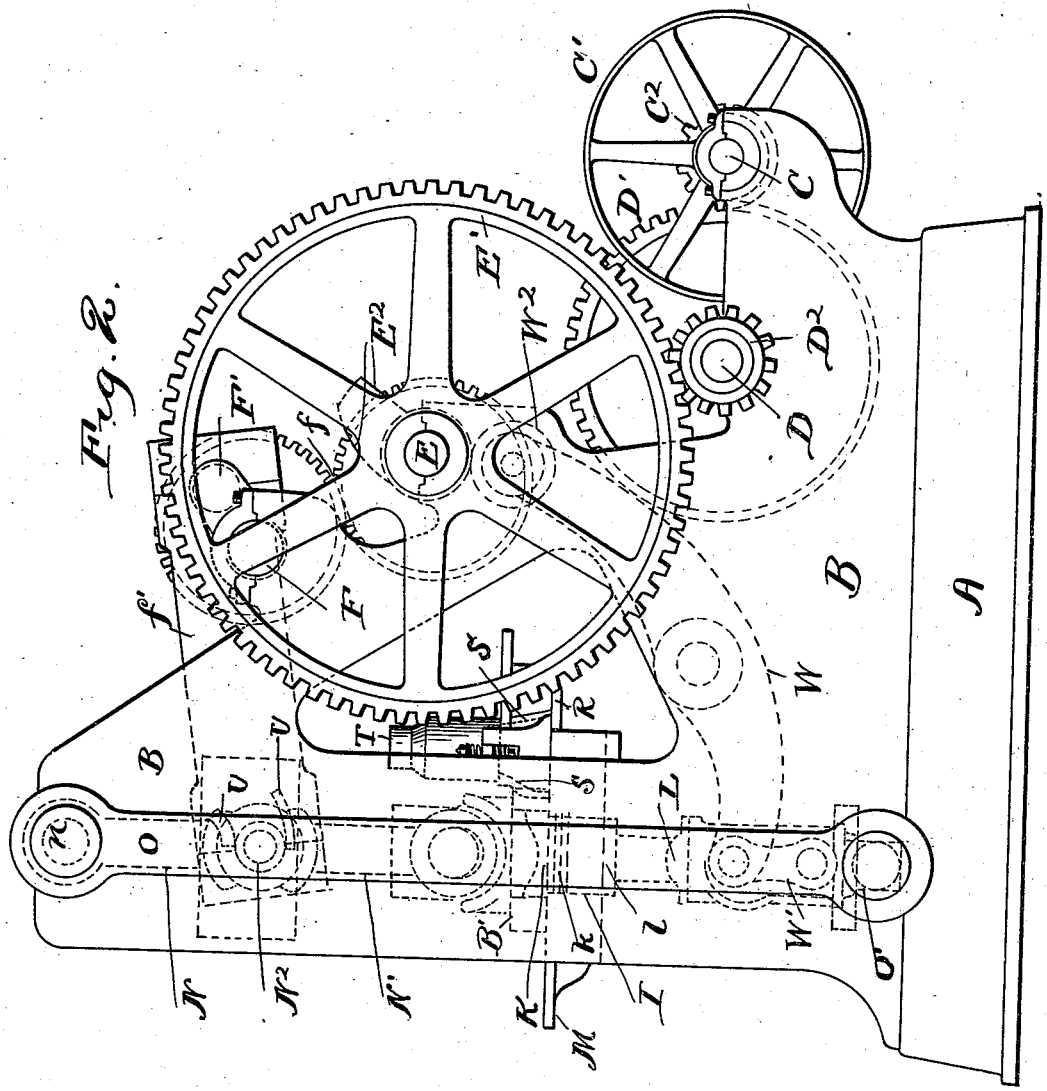

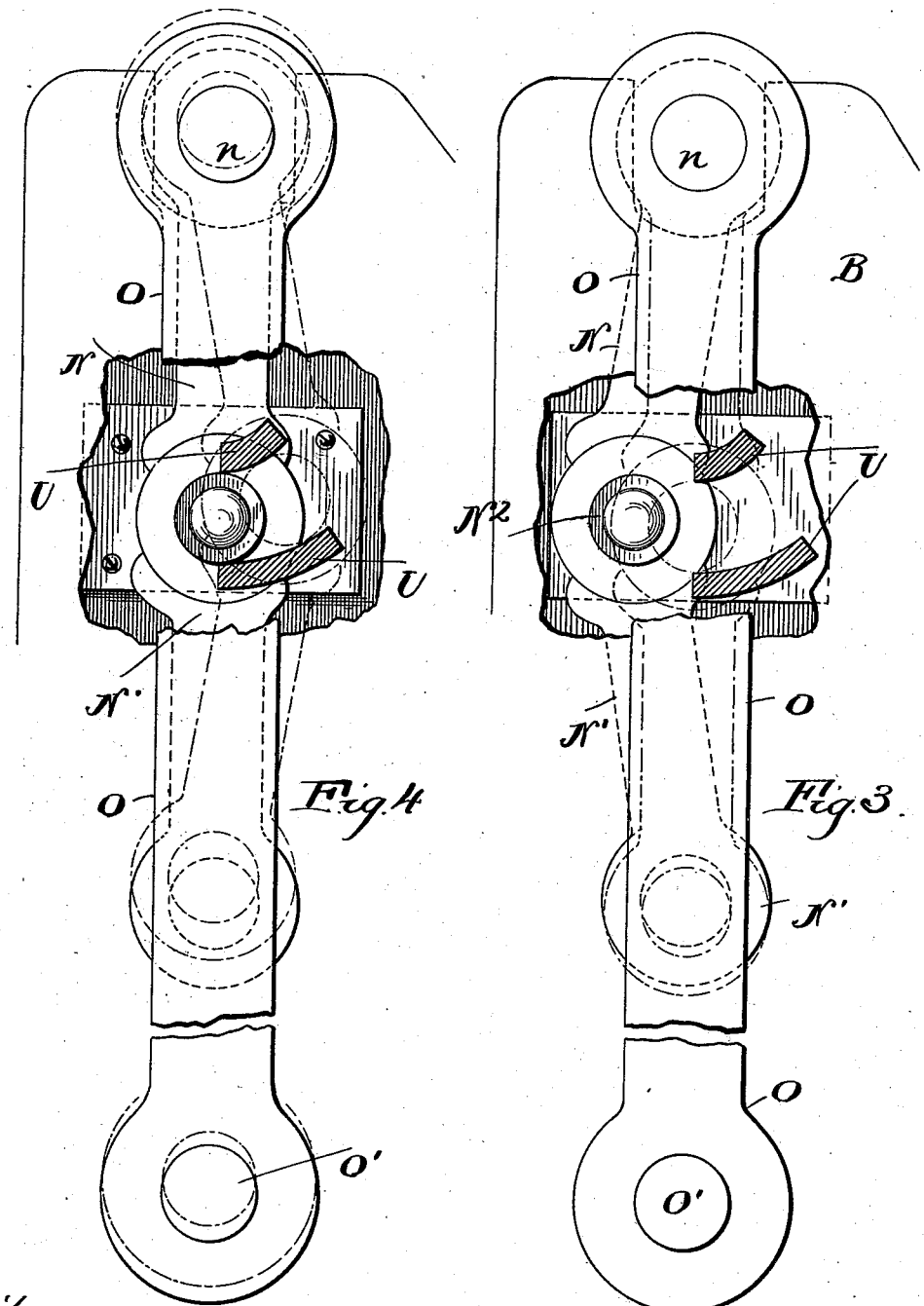

UNITED STATES PATENT OFFICE.

WILLIAM W. WALLACE AND RAYMOND C. PENFIELD, OF WILLOUGHBY, OHIO, ASSIGNORS TO J. W. PENFIELD & SON, OF SAME PLACE.

BRICK-PRESS.

SPECIFICATION forming part of Letters Patent No. 548,936, dated October 29, 1895.

Application filed December 30, 1893. Renewed April 6, 1895. Serial No. 544,825. (No model.)

*To all whom it may concern:*

Be it known that we, WILLIAM W. WALLACE and RAYMOND C. PENFIELD, of Willoughby, in the county of Lake and State of Ohio, have invented certain new and useful Improvements in Brick-Presses; and we do hereby declare the following to be a full, clear, and exact description of the invention, such as will enable others skilled in the art to which it pertains to make and use the same.

Our invention relates to improvements in brick-presses, more especially to what are known as "dry" brick-presses, the object being to construct a machine whereby a solid and durable and highly polished product is obtained.

With this object in view our invention consists in certain features of construction and in combinations of parts hereinafter described, and pointed out in the claims.

In the accompanying drawings, Figure 1 is a front side elevation of a brick-press embodying our invention. Fig. 2 is a right-hand side elevation relative to Fig. 1. Figs. 3 and 4 are enlarged side elevations in detail, partly in section, on line 3 3, Fig. 1, and portions being broken away to more clearly show the construction, Fig. 3 showing in solid lines the position of parts with the toggle-arms ready to make their rearward stroke and in dotted lines the position of parts with the toggle-arms straightened in their rearward movement, and Fig. 4 showing in solid lines the position of the toggle-arms and connected parts indicated by dotted lines in Fig. 3 and showing in dotted lines the position of parts when the toggle-arms have moved beyond a straightened position in their rearward movement.

The supporting structure of the machine comprises a base A and two heavy side frames B B, rigidly mounted upon the base. The side frames are provided with suitable boxes that afford bearing, respectively, for shafts C, D, E, and F.

C designates the driving-shaft, (see Fig. 2,) that is supported at the rear extremity of the supporting structure, said shaft being provided with a driving-pulley C'.

On shaft C (see Fig. 2) is operatively mounted a pinion $C^2$, that meshes with a gear D' on shaft D. A pinion $D^2$ is also operatively mounted upon shaft C and meshes with a gear E', operatively mounted upon shaft E. Shaft D is located a suitable distance forward of, but preferably in the same horizontal plane with, the driving-shaft, and shaft E is, of course, supported a suitable distance above and somewhat forward of shaft D. A cam $E^2$, that operates the mechanism for actuating the lower plunger, hereinafter referred to, is also operatively mounted upon shaft E. Shaft F is located a suitable distance above and somewhat forward of shaft E, and shaft F is intergeared with shaft E, as at *f*.

I represents the die or mold in which the material is compressed, said die or mold being suitably supported from and between the upright side frames of the supporting structure.

K and L represent the upper and lower plungers, respectively, the upper plunger K being adapted to compress the material in the die or mold from above, and lower plunger L being adapted to compress the material from below and elevate the pressed material or bricks from the die or mold flush with the top surfaces of the die or mold and table M suitably supported in front of the die or mold. The plungers comprise, respectively, a series of heads *k l*, that are adapted to fit the respective compartments of the die or mold, which it is not considered necessary to illustrate in detail.

The upper plunger K is actuated by toggle-arms N N', suitably connected with each other and operatively connected by means of a link *f'* with the crank F' of crank-shaft F. The lower end of the lower toggle-arm is suitably pivoted to the upper plunger, and the upper end of the upper toggle-arm is pivotally connected, as at *n*, with vertically-movable side bars O O.

There should be enough lost motion left between the pin that pivotally secures the upper plunger to the lower toggle-arm and its seat in the plunger to acommodate the movement of the toggle-arms beyond a straightened position in either direction.

The front table M, as already indicated, receives the pressed bricks as the latter are elevated from the die or mold, and from said table the bricks are supposed to be removed by hand. Another table R is suitably supported at the rear of the die or mold, the top surface of said rear table being flush with the top surfaces of the die or mold and forward table. On the rear table operates a reciprocating feed-box S, and over this feed-box is suitably supported a feed-hopper T, that discharges into the feed-box. The feed-hopper is supported in any suitable manner. The feed-box rests upon the rear table and is adapted to be reciprocated upon said table by any suitable mechanism. (Not shown.) The feed-box, having received the discharge from the hopper, is thrust forward over the die or mold, where the material discharges into the die or mold by gravity, and as the feed-box is thrust forward to deliver the material into the die or mold it pushes forward the bricks already pressed onto the table M, where they are supposed to be removed by hand or otherwise, the pressed bricks being elevated from the die or mold by the lower plunger.

The lower plunger, as already indicated, is adapted to elevate the bricks flush with the top surface of the mold, subject to the action of the front side of the feed-box that pushes the bricks onto the front table. The mechanism employed for actuating the lower plunger is preferably as shown in Fig. 2 and comprises a lever W, that near its longitudinal center is suitably supported from the upright side frames of the supporting structure. Lever W is operatively connected with the lower plunger by means of a link or pitman W' and at its opposite end is provided with a roller $W^2$, that at the proper time is engaged by cam $E^2$, that actuates the lever to lift the lower plunger, resulting in the elevation of the bricks from the die or mold. Upon the disengagement of said cam and lever the latter reverses by gravity of the lower plunger.

Side bars O are connected below with a heavy bar O', that is arranged transversely of the machine. The parts are so arranged and timed that while the upper plunger is being thrust downwardly by the action of the toggle-arms, the lower plunger engages the top side of transverse bar O'. The descent of the upper plunger in compressing the material in the die or mold is limited by stops B', formed upon the inner side of the upright side frames of the supporting structure, and the arrangement of parts is such that the upper plunger during its descent shall engage the aforesaid stops before the toggle-arms are entirely straightened, or so that the further movement of the toggle-arms in the direction to straighten shall, through the medium of the aforesaid side bars O, with which the upper toggle-arm is operatively connected, as hereinbefore described, lift the aforesaid transversely-arranged bar O' and thereby elevate the lower plunger, so that the bricks shall be pressed partly from below as well as partly from above, by means of which two pressures the compression of the bricks throughout will be given great uniformity, the parts being preferably so arranged and timed that the compression of the lower plunger immediately follows the compression of the upper plunger. The throw of the crank of crank-shaft F is, however, such that the toggle-arms will be actuated beyond a straightened position with each stroke of said arms—that is, the toggle-arms in their actuation rearwardly to effect compression by the upper plunger will be moved beyond a straightened position, as shown in dotted lines, Fig. 4, and as the toggle-arms are thus actuated beyond a straightened position in their rearward actuation the axial pin of the joint of the toggle-arms or rollers $N^2$ on said pin will engage and ride up one or more flanges, ways, or guides U, formed upon the inner sides of the side frames of the supporting structure, the trend of said ways, flanges, or guides being such as to elevate the toggle-arms, bar, or beam O' and the side bars connected with said beam or bar and with the upper toggle-arm, resulting in the simultaneous elevation of both of the plungers and the compressed material or product in the die or mold and in the lowering of the product in the die or mold during the interval of time required to move the toggle-arms from their rearwardly-actuated position to a straightened position in the succeeding return or forward stroke of the toggle-arms.

Briefly described, the product is bodily elevated and lowered or reciprocated within the die or mold, and the friction had between the product and surrounding walls of the mold-compartment containing the product, it is obvious, will highly polish the surfaces of the product, as desired.

What we claim is—

In a brick-press, the combination of the supporting-structure comprising a supporting-base and two upright side-frames located a suitable interval apart, a die or mold suitably supported from and between said upright frames, upper and lower plungers for compressing or engaging the material within the die or mold, the lower plunger being adapted to elevate the brick from the die or mold, toggle-arms for elevating and lowering the upper plunger, suitable means for actuating said toggle-arms beyond a straightened position in either direction, suitable means for elevating the lower plunger and operatively connected with the toggle-arms, one or more flanges, guides or ways U formed or constructed upon the aforesaid side-frames, and a member or members carried by the toggle-arms and adapted to engage and ride upon said flanges, ways, or guides, the arrangement of parts and the trend of said guide or guides being substantially as described for the purpose specified.

In testimony whereof we sign this specification, in the presence of two witnesses, this 11th day of December, 1893.

WILLIAM W. WALLACE.
RAYMOND C. PENFIELD.

Witnesses:
L. W. PENFIELD,
J. A. GREEN.